US009374409B2

(12) United States Patent
Gouache et al.

(10) Patent No.: US 9,374,409 B2
(45) Date of Patent: Jun. 21, 2016

(54) SYSTEM AND METHOD FOR ADAPTIVE STREAMING IN A MULTIPATH ENVIRONMENT

(71) Applicant: Thomson Licensing, Issy de Moulineaux (FR)

(72) Inventors: Stephane Gouache, Cesson Sevigne (FR); Guillaume Bichot, Cesson Sevigne (FR); Amine Bsila, Cesson Sevigne (FR)

(73) Assignee: THOMSON LICENSING, Issy les-Moulineaux (FR)

( * ) Notice: Subject to any disclaimer, the term of this patent is extended or adjusted under 35 U.S.C. 154(b) by 626 days.

(21) Appl. No.: 13/717,760

(22) Filed: Dec. 18, 2012

(65) Prior Publication Data

US 2013/0166768 A1 Jun. 27, 2013

(30) Foreign Application Priority Data

Dec. 22, 2011 (FR) .................................... 11 306744

(51) Int. Cl.
*G06F 15/16* (2006.01)
*H04L 29/06* (2006.01)
*H04N 21/2665* (2011.01)
*H04N 21/63* (2011.01)
(Continued)

(52) U.S. Cl.
CPC .............. *H04L 65/608* (2013.01); *H04L 65/00* (2013.01); *H04L 65/80* (2013.01); *H04N 21/2665* (2013.01); *H04N 21/631* (2013.01); *H04N 21/6373* (2013.01); *H04N 21/6437* (2013.01)

(58) Field of Classification Search
USPC ......... 709/203, 204, 206, 228, 231, 233, 224; 375/240.26; 370/261, 389, 392; 345/553, 557; 715/716
See application file for complete search history.

(56) References Cited

U.S. PATENT DOCUMENTS

| 6,405,256 B1 | 6/2002 | Lin et al. |
| 7,231,442 B2 * | 6/2007 | Chen ..................... H04L 41/142 709/224 |
| 7,295,210 B2 * | 11/2007 | Sadowski et al. ............. 345/553 |

(Continued)

FOREIGN PATENT DOCUMENTS

| WO | WO02073441 | 9/2002 |
| WO | WO2010020843 | 2/2010 |

(Continued)

OTHER PUBLICATIONS

3GPP TS 26.244: Transparent end to end packet switched streamingservice (PSS)TS 26.244, V6.3.0, Mar. 2005.

(Continued)

*Primary Examiner* — Quang N Nguyen
(74) *Attorney, Agent, or Firm* — Brian J. Dorini; Catherine A. Cooper

(57) ABSTRACT

This invention relates to a system for adaptive streaming in a multipath environment comprising a plurality of servers being respectively capable of transmitting multimedia content in a RTP/RTSP environment through a respective data path to a client, wherein the client includes a controller means being capable of probing each of said data paths in order to determine a respective bandwidth associated to each of said data paths and to request a chunk of said multimedia content for each of said servers according to the respective bandwidth. In addition, the invention relates to a method for adaptive streaming in a multipath environment.

10 Claims, 7 Drawing Sheets

(51) Int. Cl.
*H04N 21/6373* (2011.01)
*H04N 21/6437* (2011.01)

(56) References Cited

U.S. PATENT DOCUMENTS

| | | | | |
|---|---|---|---|---|
| 7,342,968 | B2* | 3/2008 | Balakrishnan et al. | 375/240.26 |
| 8,194,657 | B2* | 6/2012 | Xiong | H04L 45/00 370/389 |
| 8,335,172 | B2* | 12/2012 | Lai et al. | 370/261 |
| 8,346,959 | B2* | 1/2013 | Deshpande | 709/228 |
| 8,589,583 | B2* | 11/2013 | Gutarin et al. | 709/233 |
| 8,935,320 | B2* | 1/2015 | Zanin et al. | 709/206 |
| 8,935,508 | B1* | 1/2015 | Ardhanari et al. | 707/797 |
| 2005/0174355 | A1* | 8/2005 | Sadowsky et al. | 345/557 |
| 2006/0215596 | A1 | 9/2006 | Krishnaswamy et al. | |
| 2008/0089445 | A1 | 4/2008 | Kuo et al. | |
| 2008/0163056 | A1* | 7/2008 | Lamadon | G06F 3/0482 715/716 |
| 2008/0189429 | A1* | 8/2008 | DaCosta | 709/231 |
| 2008/0291916 | A1* | 11/2008 | Xiong | H04L 45/00 370/392 |
| 2009/0089445 | A1 | 4/2009 | Deshpande | |
| 2009/0259762 | A1 | 10/2009 | Karlsson et al. | |
| 2010/0094955 | A1 | 4/2010 | Zuckerman et al. | |
| 2010/0268761 | A1* | 10/2010 | Masson | 709/203 |
| 2011/0055328 | A1* | 3/2011 | Lahr et al. | 709/204 |

FOREIGN PATENT DOCUMENTS

| | | |
|---|---|---|
| WO | WO2010111261 | 9/2010 |
| WO | WO2011047499 | 4/2011 |

OTHER PUBLICATIONS

Gouache et al.:"Distributed & adaptive HTTP streaming", Multimedia and Expo (ICME), 2011 IEEE International Conference ON, IEEE, Jul. 11, 2011, pp. 1-6, XP031964706.

Nguyen et al.:"Multiple Sender Distributed Video Streaming", IEEE Transactions on Multimedia, IEEE Service Center, Piscataway, NJ, US vol. 6, n° 2., Apr. 1, 2004.

Schierl Fraunhofer HHI J Lennox Vidyo T:"Multi-Session and Multi-Source Transmission in the Real-Time Transport Protocol (RTP); draft-schierl-avt-rtp-multi-session-transmission-00.txt".

Schulzrinne Columbia University A Rao Cisci R Lanphier M Westerlud Ericsson AB M Stiemerling (ED) H:"Real-Time Streaming Protocol 2.0 (RTSP); draft-ietf-mmusic-rfc2326bis 28.txt", Real Time Streaming Protocol 2.0 (RTSP).

Schulzrinne Columbia University S Casner Packet Design R Frederick Blue Coat Systems Inc V Jacobson Packet Design H:"RTP: a Transport Protocol for Real-Time applications; rfc3550.txt".

European search report dated Apr. 20, 2012.

* cited by examiner

SYSTEM AND METHOD FOR ADAPTIVE STREAMING IN A MULTIPATH ENVIRONMENT

This application claims the benefit, under 35 U.S.C. §119 of EP Patent Application 11306744.1, filed 22 Dec. 2011.

INTRODUCTION

This invention relates to a system for adaptive streaming in a multipath environment. More particularly, this invention relates to a system for adaptive streaming in a multipath environment in which network bandwidth conditions are not guaranteed and therefore fluctuating so as to enhance audio/video streaming. Furthermore, the invention relates to a method for adaptive streaming in a multipath environment.

BACKGROUND TO THE INVENTION

Streaming is the process where the content consumed by a client is sent in small pieces to the client as opposed to downloading, where the whole multimedia file is transferred to the client before playing. Existing streaming protocols include a Real-Time Transport Protocol (RTP) or a MPEG transport stream under user datagram protocol (MPEG TS/UDP). On the other hand, download is generally performed using a hypertext transfer protocol (HTTP protocol).

In entertainment and communications systems, RTSP Protocol (Real-Time Transport Streaming) is provided as a network control protocol for controlling streaming media servers. Transmission of streaming data by the RTSP servers is done via the Real-time Transport Protocol (RTP). RTSP defines control sequences useful in controlling playback of streaming data. The control sequences are defined in the RFC 2326 standard by the Internet Engineering Task Force (IETF).

The streaming session is initiated by the client towards the streaming server. The streaming server delivers the requested video over a unicast link towards the client. The streaming session establishment involves several RTSP messages between the client and the streaming server, typically involving content selection and indication of client characteristics such as screen size, bit rate or maximum buffer size. The unicast RTP streaming session is finally established using previously negotiated parameters. The streaming session parameters generally remain unchanged until the client selects further content or terminates the streaming session. Obviously this type of environment is not well adapted to varying network characteristics. Some operators simply chose to restrict access to certain services to clients having sufficient extra bandwidth on top of the actual required bandwidth to avoid problems.

Real-time streaming has become increasingly popular for transmitting TV-channels via the internet (IPTV). However, means have to be provided to cope with changing bandwidth rates between the multimedia provider and the client. Otherwise, "freezing" of multimedia streams would occur, which is generally considered as a nuisance by the customer.

Various attempts have been made with respect to solve the above-mentioned problem of changing bandwidth rates.

In WO 2002/073441 A1 a single file is divided into multiple sub-files that are subsequently distributed and stored onto one or more servers. The sub-files may be transmitted in parallel and simultaneously from one or more servers, which increases the rate at which the data can be delivered. Furthermore, at least one of the sub-files can be stored on more than one server to provide redundancy. If a server is not available, or if the transmission link is slow or not available, the sub-file can be streamed from another server.

In US 2009/0259762 A1 a distributed and scalable content streaming architecture is shown which includes a plurality of controllers and a plurality of servers. The controllers are operable to establish Real-Time Streaming Protocol (RTSP) sessions with individual devices. A controller selects a server to provide a requested media stream to a device. The server may be selected based on its proximity to the device, bandwidth availability, or latency characteristics. Additional servers can be added to a system without disrupting system operation.

WO 2010/111261 A1 shows a streaming media system, which employs dynamic rate adaptation. This includes a file format compatible with legacy HTTP infrastructure to deliver media over a persistent connection. The legacy client media players are able to dynamically change the encoded delivery rate of the media over a persistent connection.

In US 2010/0094955 A1 a distributed storage is shown wherein for each group of at least one assembling device, a subgroup of fractional-storage CDN servers according to at least one criterion is selected. A plurality of server subgroups is selected for a plurality of assembling device groups. Erasure-coded fragments associated with multiple segments of contents are retrieved by the assembling devices from the subgroups of servers, until the aggregated bandwidth used for retrieving the fragments approaches the aggregated bandwidth of the servers included in the subgroups, and as long as the aggregated bandwidth used for delivering each segment does not exceed the aggregated bandwidth of the servers storing the fragments generated from the segment.

US 2006/0215596 A1 transfer rate adjustments for a device, e.g. a multimedia server, are shown. These rate adjustments are based upon determining by the multimedia server various quality of service parameters from a wireless link between two other network nodes, which may comprise an access point and a video player, respectively.

U.S. Pat. No. 6,405,256B1 data streaming transmission is disclosed with a network server connected to client device through a communication network with one or more of caching servers. The network server has a data streaming application and a memory for storing data. A series of connections, each using a data streaming arrangement, is formed in the path between the source network and client device by the caching servers. Each caching server can absorb network congestion in its downstream connection by utilizing an expandable buffer for storing additional segments of the streamed data and varying the transmission data rate in the downstream connection.

Furthermore, the 3rd Generation Partnership Project (3GPP) has standardized a delivery framework including a container format capable of storing multiple versions (that should have different encoding bit rates) of a same content that, associated with a smart control logic on the streaming server side, can cope with variations of the network conditions. This control logic has however not been specified by 3GPP.

HTTP streaming is a technology recently advertised by Apple with its iPhone, by Microsoft with Smoothstreaming or by 3GPP with its HTTP Adaptive streaming.

Recent techniques use the HTTP protocol to periodically provide feedback from the client to the server about the current network conditions. The adaptive content, being small chunks of multimedia content of fixed duration but with varying bit rate, is served to the client according while constantly adapting to network conditions.

The obvious drawback is that the quality perceived by the client can be severely degraded as the bandwidth varies. Furthermore, those techniques do not leverage existing IPTV equipments relying on RTP/RTSP protocols.

Accordingly, there is a need in the art to provide a method and a system for adaptive streaming in a multipath environment that respectively overcome—at least partially—the problems associated with the prior art systems.

SUMMARY OF THE INVENTION

According to the invention, there is provided a system for adaptive streaming in a multipath environment comprising a plurality of servers being respectively capable of transmitting multimedia content in a RTP/RTSP environment through a respective data path to a client, wherein the client includes a controller means being capable of probing each of said data paths in order to determine a respective bandwidth associated to each of said data paths and to request a chunk of said multimedia content for each of said servers according to the respective bandwidth.

According to an embodiment of the invention, the controller means includes means for path rate estimation being capable of performing server speed control, bandwidth measurement and bandwidth estimation for each respective server and data path.

According to a further embodiment of the invention, the controller means includes means for chunk scheduling being capable of performing a bit rate selection for the next chunk to be delivered by the respective server.

According to a further embodiment of the invention, the controller means includes means for bin allocation being capable of linking a specific chunk of one of the servers to a bin allocated from a linked list in order to achieve a correct consumption order.

According to a further embodiment of the invention, the controller means includes means for RTP re-numbering and re-time stamping being capable of updating RTP timestamps and sequence numbers such that a decoder cannot distinguish a stream received from multiple servers from a stream received from a single server.

In a further aspect of the invention, there is provided a method for adaptive streaming in a multipath environment which comprises providing a client and providing a plurality of servers being respectively capable of transmitting multimedia content in a RTP/RTSP environment through a respective data path to the client, wherein the client includes a controller means being capable of probing each of said data paths in order to determine a respective bandwidth associated to each of said data paths and to request a chunk of said multimedia content for each of said servers according to the respective bandwidth.

According to an embodiment of the invention, the controller means includes means for path rate estimation to perform server speed control, bandwidth measurement and bandwidth estimation in parallel for each of the servers being used in the multipath streaming session.

According to an embodiment of the invention, the path rate estimation is repeated periodically.

According to an embodiment of the invention, the path rate estimation controls the speed of each server by adding a speed RTS standard attribute to a play request so as to determine whether the respective data path would sustain the transmission at a rate higher than the current rate.

According to an embodiment of the invention, the current rate is for each server then used by a smoothing algorithm to iteratively determine a reliable estimate to infer the achievable bit rate from the bit rate measured during the previous iterations.

According to an embodiment of the invention, for each server a variance is computed for the current rate.

According to an embodiment of the invention, the controller means includes means for chunk scheduling being capable of performing a bit rate selection for the next chunk to be delivered by the respective server.

According to an embodiment of the invention, individual bit rate estimates are summed for all servers to get the aggregate bit rate and a chunk's play out rate is selected at the encoding bit rate immediately inferior to the aggregate bit rate.

According to an embodiment of the invention, the controller means includes means for bin allocation being capable of linking a specific chunk of one of the servers to a bin allocated from a linked list in order to achieve a correct consumption order.

According to an embodiment of the invention, controller means includes means for RTP re-numbering and re-time stamping being capable of updating RTP timestamps and sequence numbers such that a decoder cannot distinguish a stream received from multiple servers from a stream received from a single server.

The invention proposes a mechanism offering immediate control over the streaming rate to the client while leveraging an existing IPTV infrastructure using the RTSP/RTP protocol. RTSP (RFC 2326) is a protocol to establish and control media streaming. It does not cover the transport protocol for the data itself, which is commonly RTP. Further, it compensates network fluctuations by concurrent usage of multiple communication paths, thus smoothing out the overall reception rate and associated user experience.

A file format is proposed by the invention, which allows seamless switching between the versions at different bit rates, similarly to HTTP adaptive streaming.

A smart usage of the RTSP protocol allows probing of the state of the network and control of the stream rate by the client without modifying the existing server infrastructure while leveraging multipath communication. Instead of requesting an entire stream as with legacy IPTV, the client receives independent fragments of the streams from multiple servers to benefit from multipath communication. The transmission rate is adjusted individually for each server to minimize the risk of network congestion.

Moreover, the client periodically requests the servers to stream small fragments of the stream at a higher rate than the nominal rate to evaluate the capacity of the network between itself and the server to deliver a more important share of the content. When the aggregate capacity of all network paths is sufficient for a higher bit rate stream, the client sends a different request to all the servers to select a higher bit rate version of the stream. When the stream reception rate is too slow for the current play out rate, the client requests the servers to select a lower bit rate version of the content.

The invention adds the capability to adapt to network variations in the so-called IPTV (managed) environment by being fully compatible with the associated protocol suite based on RTSP/RTP without requiring replacing the equipments. Moreover, it tends to smooth out quick bandwidth variations of a single network path by distributing the communication over multiple network paths.

DETAILED DESCRIPTION OF THE INVENTION

The invention will now be described in greater detail by way of example with reference to the following drawing in which.

Figure 1:
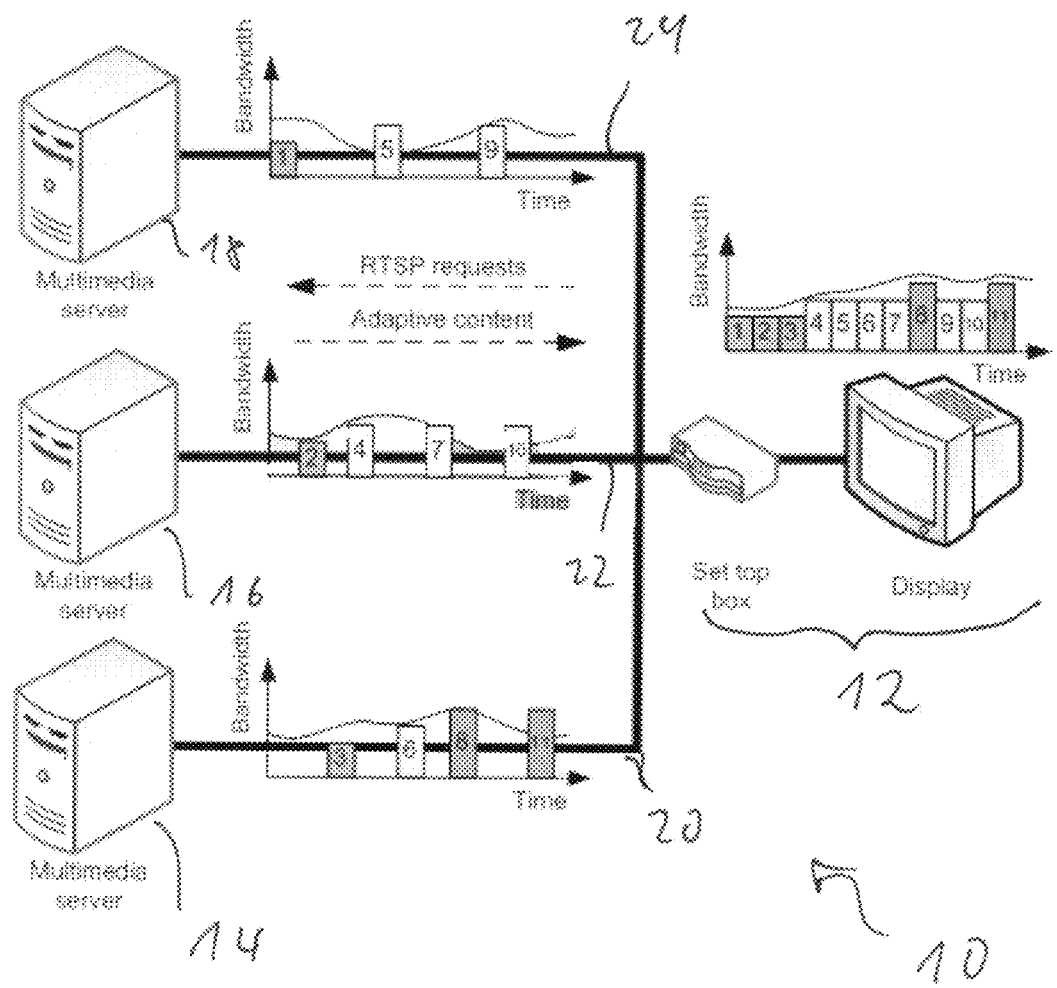
FIG. 1 shows a schematic view of a system for adaptive streaming in a multipath environment according to an embodiment of the invention.

In the drawing, alike reference numerals refer to alike parts, unless otherwise indicated.

Referring now to FIG. 1 in particular, the invention embodied therein comprises a system 10 for adaptive streaming in a multipath environment which comprises a client 12 and a plurality of servers being respectively capable of transmitting multimedia content in a RTP/RTSP environment through a respective data path to the client 12. The client 12 is depicted as a set-top box together with a display. In FIG. 1, a first server 14, a second server 16 and a third server 18 are shown is an example, which are respectively connected through a first path 20, a second path 22 and a third path 24 to the client.

Similarly to most adaptive streaming techniques, the content must be pre-encoded at multiple bit rates to support adaptive delivery. In addition, the different versions of the streams are "GOP aligned" which means that the positions of the reference frames, which allow random access into the streams, are located at the same time instants for all the different bit rate streams. This property allows a decoder to switch between different streams at some precise locations (the reference frames) without any visual artefact. The client 12 is then allowed to request/download a chunk of any of these stream versions wherein the chunk is a set of GOPs and has a constant duration e.g. 2 s.

This multi bit rate content is then distributed to the servers 14, 16, 18, together with a description file listing the available bit rates. This description file is similar to the manifest file used in typical adaptive streaming implementations. In this embodiment, the description file is implemented as a SDP file.

Figure 2:
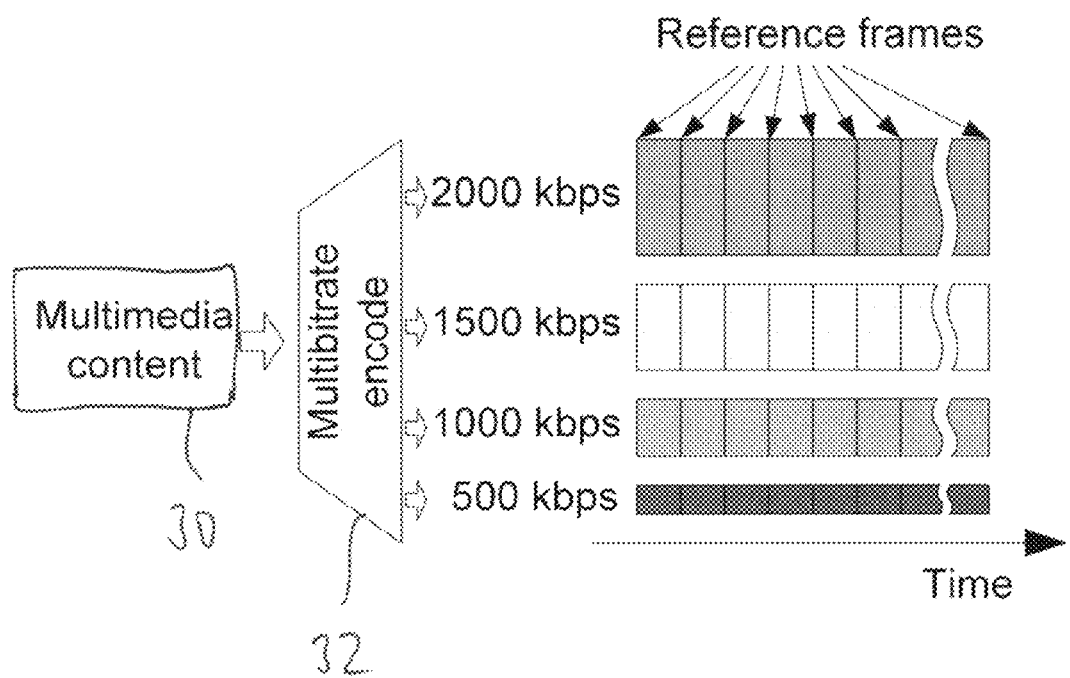
FIG. 2 shows a further schematic view of a system for adaptive streaming in a multipath environment according to an embodiment of the invention.

FIG. 2 depicts the content preparation: a multimedia content 30 is encoded with an encoder 32 at multiple bit rates with the additional constraint that all reference frames appear at the same instant in each encoded stream. Considering that the transition from a bit rate to another one can occur less often than at each GOP, the alignment of the reference frames can be required on a periodic basis of tens of milliseconds (2 seconds in the example). In the embodiment, the content is encoded using the H.264 and AAC CODECS with reference frames appear every 2 seconds and then encapsulated into a MPEG transport stream. The example content used for describing the embodiment is encoded at the following set of total bit rates: 500 kbps, 1000 kbps, 1500 kbps, and 2000 kbps. The stream description can be expressed using the SDP protocol.

In this example, 4 MPEG TS tracks are transmitted and their bit rates are advertised using the b=TIAS attribute in SDP protocol. In addition, the "X-altservers" attribute provides the client 12 with a list of alternative locations from which the content 30 can be received. These alternative locations could be used instead of the main location as they hold the exact same.

Figure 3:
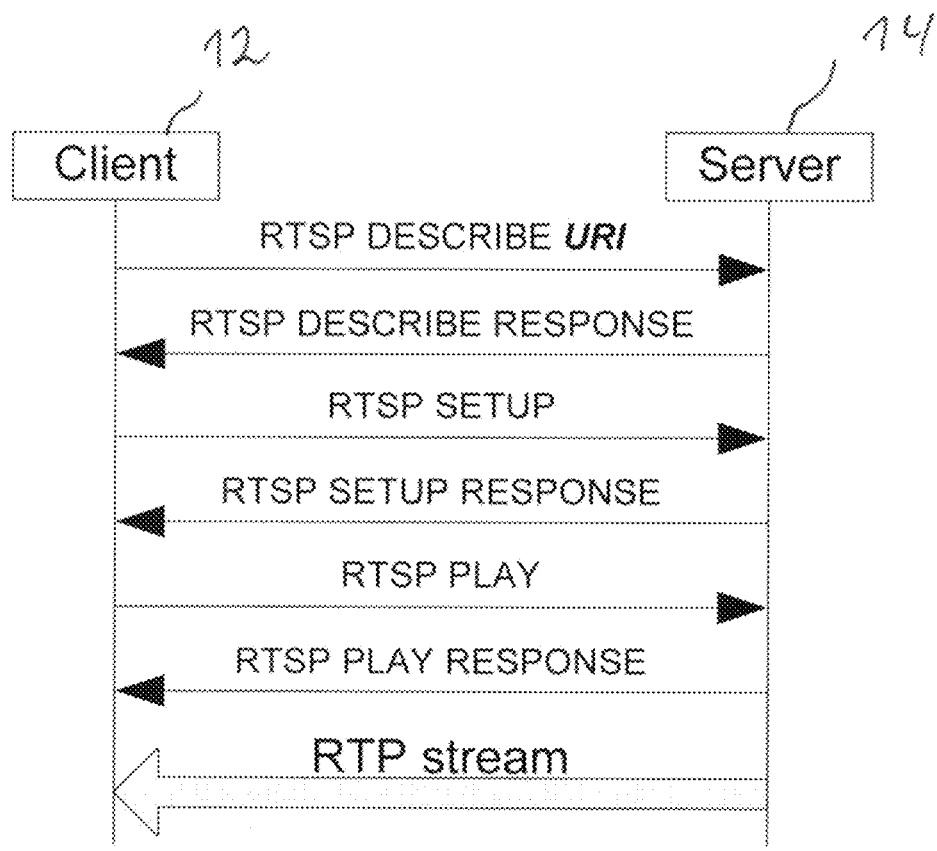
FIG. 3 shows a schematic view of client-server communication according to an embodiment of the invention.

The normal RTSP operation to control a streaming session is depicted in FIG. 3. The first message allows the client 12 to discover the properties of the stream. The second message called SETUP prepares the streaming session, and finally the PLAY message makes the server 14 to start sending the multimedia stream.

In the invention, the client switches from one stream to the other during the streaming session. In this embodiment, for the sake of clarity, the client issues several SETUP messages at the start of the streaming session. One setup is done for each available track. It is however obvious that the SETUP message for each track could also be issued by the client just before the client actually needs to receive that track.

Figure 4:
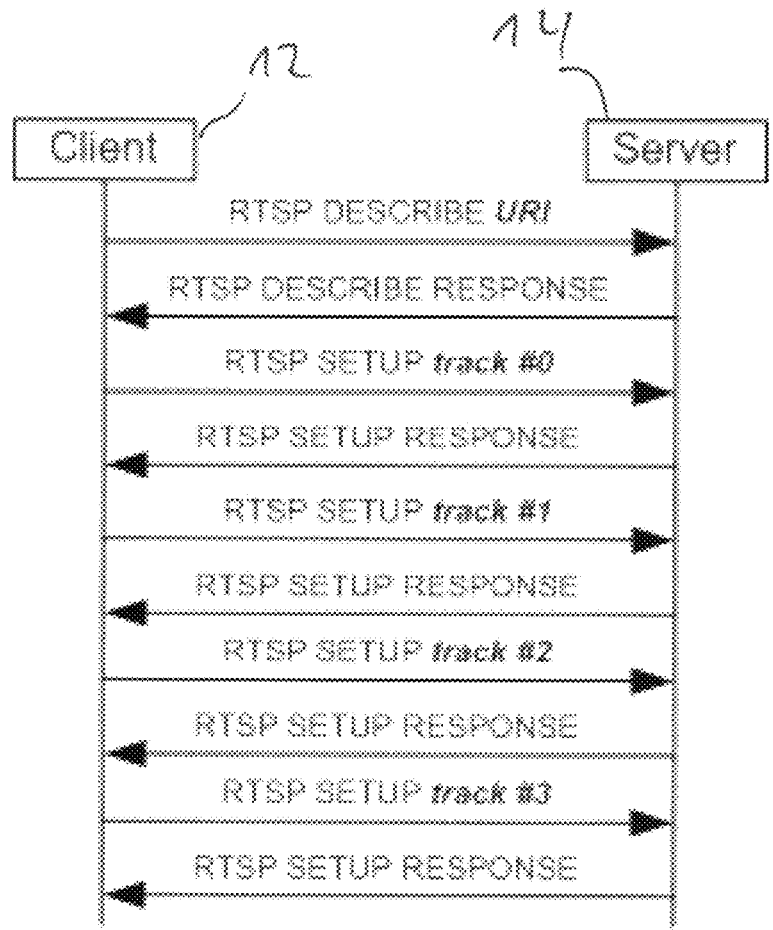
FIG. 4 shows a further schematic view of client-server communication according to an embodiment of the invention.

This multi-track setup phase is shown in the FIG. 4. As an optimization, the client 12 may also setup all the tracks at once by issuing a SETUP message for the session's URL instead of separate SETUP messages for the session's individual tracks. To support multi-server operation, the client 12 performs this initialization phase for every server listed in the X-altservers attribute.

Figure 5:
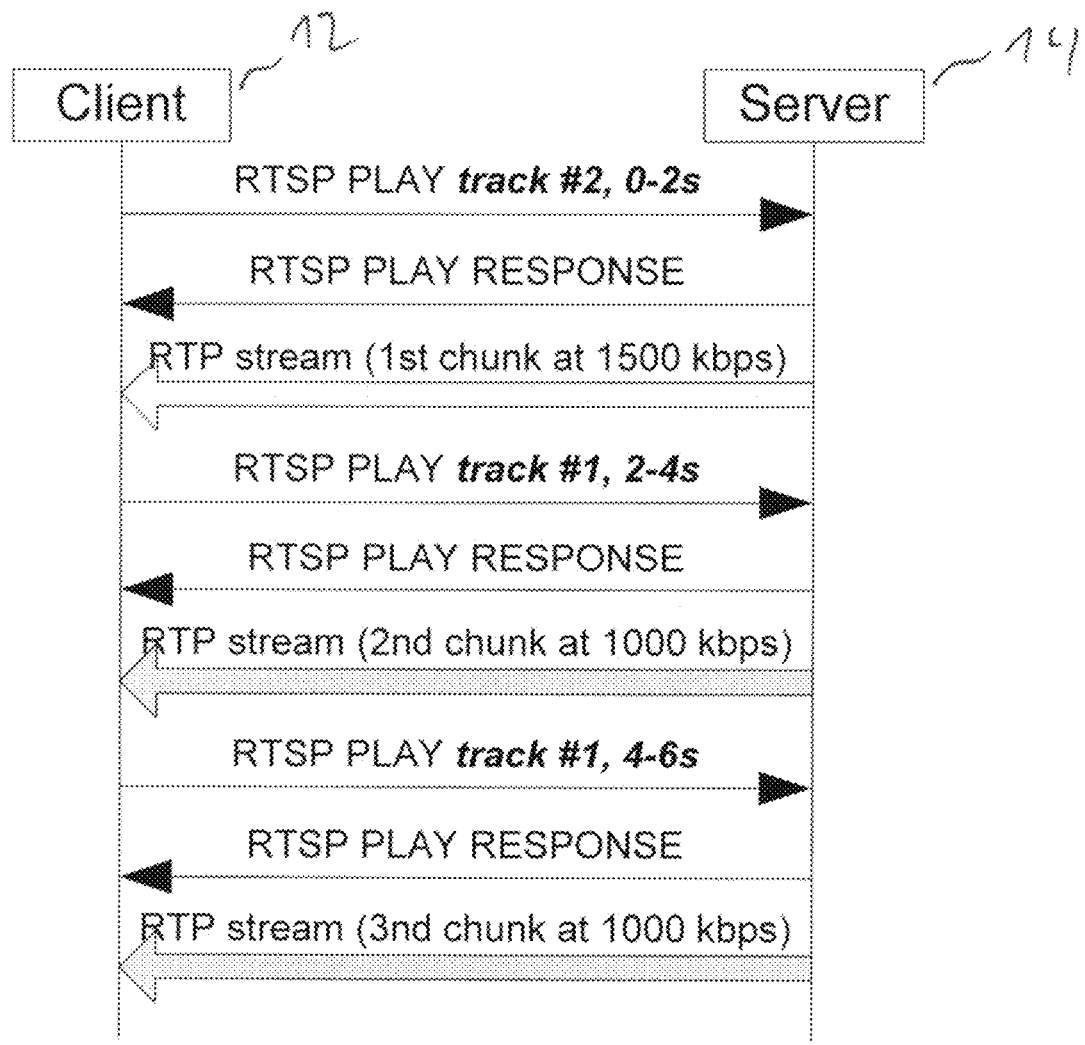
FIG. 5 shows a further schematic view of client-server communication according to an embodiment of the invention.

Once all tracks have been setup the client 12 requests small chunks of the multimedia content by issuing PLAY requests for the desired time interval from the desired track, as shown in FIG. 5.

The track is selected using the trackID found in the SDP. The time interval is indicated to the server using the Range: header. For example to select the time interval 2-4 s, the client would add the following header to its play request:

```
PLAY      rtsp://multimedia.example.com/stream/trackID=1
RTSP/1.0 Range: npt=2-4
```

To avoid playout interruptions between the stream chunks, the client issues a new RTSP PLAY request for the next chunk in advance to maintain sufficient data in the playout buffer. In our embodiment, the playout buffer contains 2 seconds of the multimedia stream downloaded in advance.

Figure 6:
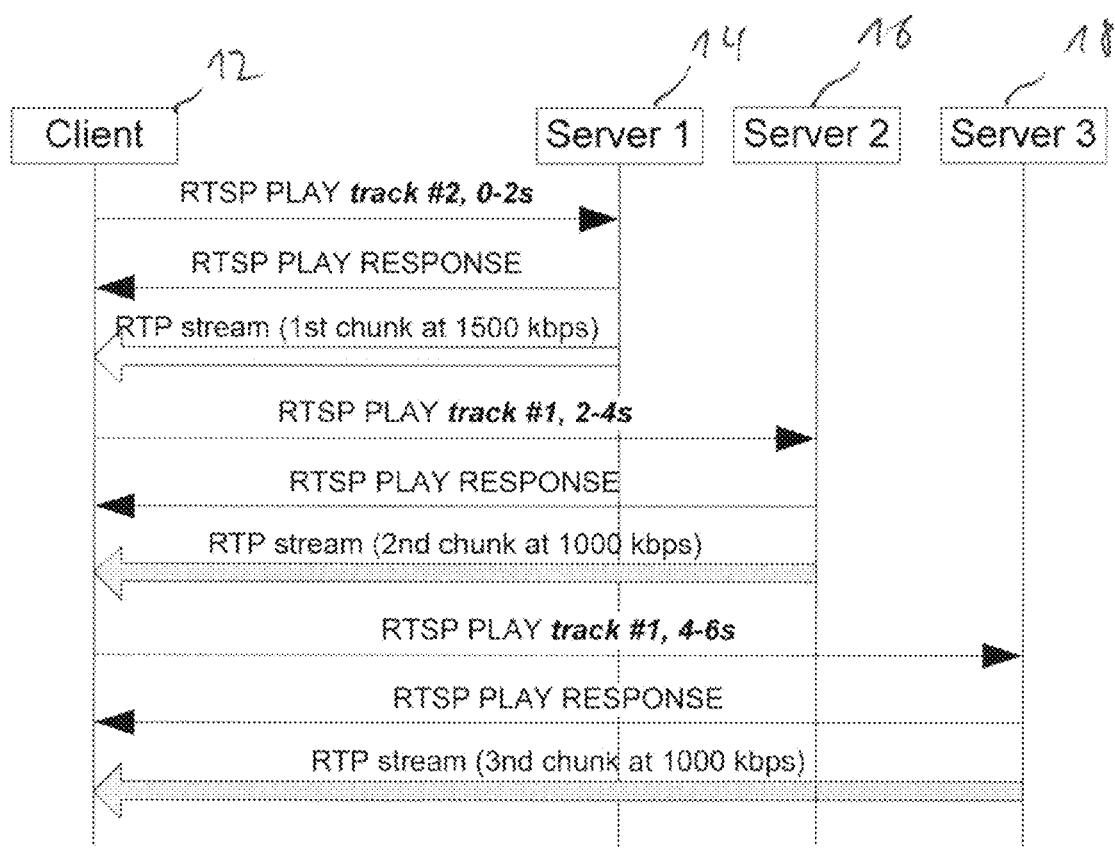
FIG. 6 shows a further schematic view of client-server communication according to an embodiment of the invention.

For multipath, multi-server operation the client 12 requests different chunks to be streamed from each server 14, 16, and 18 in parallel at a rate corresponding to the client's estimation of that network path capacity as shown in FIG. 6.

Figure 7:
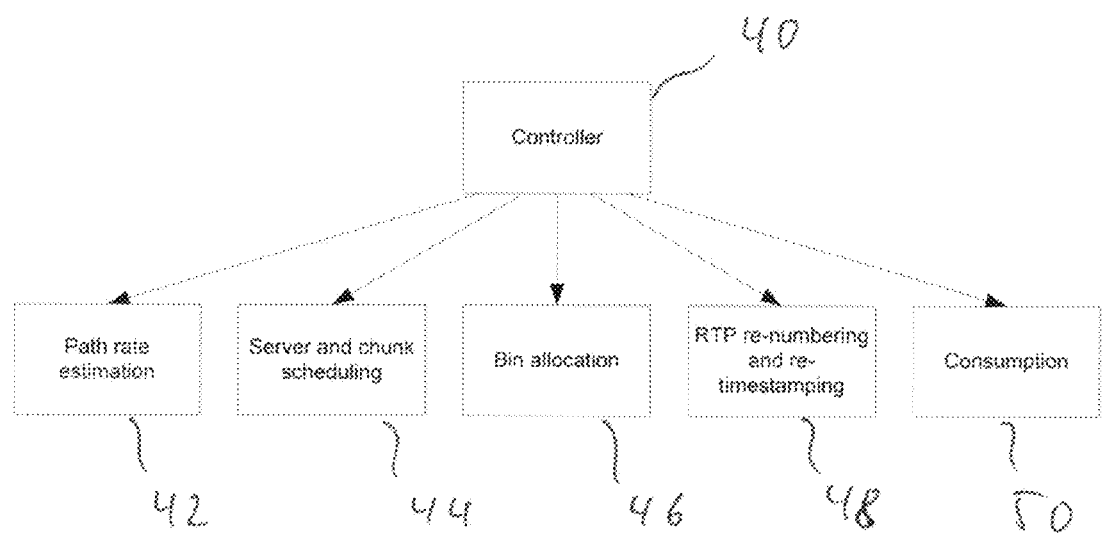
FIG. 7 shows a further schematic view of a client according to an embodiment of the invention.

FIG. 7 shows a schematic diagram of a controller 40 suitable for multipath and multi-server operation of the client 12 is shown. The controller 40 includes a means for path rate estimation 42 being capable of performing server speed control, bandwidth measurement and bandwidth estimation for each respective server and data path.

Furthermore, the controller 40 includes means for chunk scheduling 44 being capable of performing a bit rate selection for the next chunk to be delivered by the respective server. The controller 40 further includes means for bin allocation 46 being capable of linking a specific chunk of one of the servers to a bin allocated from a linked list in order to achieve a correct consumption order. The controller 40 includes a means for RTP re-numbering and for re-time stamping 48. In addition a consumption unit 50 is present which allows the received stream to be displayed.

The client 12 aggregates these received streams into a single stream in such a manner that it is identical to a stream that would have been received from a single server, that is, the sequence number and RTP timestamps are monotonically increasing. This task involves buffering and renumbering of the RTP packets received from the different servers. This is solved by the bin allocation and RTP re-numbering step shown in FIG. 7. Finally this aggregated stream is injected into the client's decoding buffer.

The path rate (available bit-rate for a path) is estimated by the means for path rate estimation 42 independently for each server 14, 16 and 18 and the associated network path 20, 22, and 24. So the process described in the following is performed in parallel for each of the servers being used in the multipath streaming session.

The bandwidth estimation process is composed of the following steps. Firstly, server speed control is performed. Accordingly, the sending speed of the server 14, 16, and 18 is managed by the client 12 to measure the actual available bit rate of the network path 20, 22, and 24. Secondly, bandwidth measurement takes place. Accordingly, the characteristics of the stream received by the client 12 compared to the server 14, 16 and 18 sending speed to determine the current network bit rate for the current chunk are determined. Thirdly, bandwidth estimation is performed. The individual bandwidth measurements are smoothed out to produce an accurate value usable to select the following chunks.

So, the sending speed of the server is managed by the client to measure the actual available bit-rate of the network.

The bandwidth measurement consists in determining the characteristics of the stream received by a client compared to the server sending speed to determine the current network bit-rate for the current chunk.

The bandwidth estimation consists in smoothing the individual bandwidth estimation in order to produce an accurate value usable to select the following chunks.

The whole bandwidth estimation process is repeated periodically but not necessarily for every chunk, in situations where the network conditions vary slowly.

Advantageously, it is then possible to use the slowest paths to get the chunks that are to be rendered "far" in in time and to use the fastest paths to get the chunks to be rendered "soon".

The speed of the server 14, 16 and 18 is controlled by adding an already standard attribute "Speed" to the PLAY request. The idea behind modifying the server speed is to determine whether the network would sustain the transmission at a rate higher than the current rate. In the embodiment of FIGS. 6 and 7, the client 12 periodically probes the capacity of the network to transmit 20% faster by requesting the server to send a chunk at 1.2 times the current speed.

An example RTSP request would be:

```
PLAY        rtsp://multimedia.example.com/stream/trackID=1
RTSP/1.0
CSeq: 833
Range: npt=2-4
Speed: 1.2
```

The server would respond to the above request as follows:

```
RTSP/1.0 200 OK
CSeq: 834
Range: npt=2-4
RTP
Info:url=rtsp://multimedia.example.com/stream/trackID=1;seq=45102;
rtptime=12345678
```

A parameter called rtptime indicates the RTP timestamp corresponding to the start of the selected npt range. With a given clock rate, the client determines the rtptime range corresponding to the requested chunk. To compute the current bit rate $B_i$, the client 12 sums the RTP packet bytes received in the above rtptime interval. It divides this by the transmit duration of these bytes (measured between first received byte and last received byte):

$$B_i = \text{Bytes} \cdot 8 / \text{transmitDuration}$$

This current bit rate is then used by a smoothing algorithm to determine a reliable estimate. The algorithm used in this embodiment is iterative and attempts to infer the achievable bit rate from the bit rate measured during the previous iterations.

The average bit rate for the next iteration is computed as the weighted average of the current bit rate average and the current measure as shown in the formula below:

$$\text{avg}_{i+1} = (1-\alpha) \cdot \text{avg}_i + \alpha \cdot B_i$$

Where $B_i$ is the measured bit rate $\text{avg}_i$ is the average bit rate computed for the current iteration, and $\alpha$ is the weight given to the current bit rate measurement. In one example, the weight has been chosen as $\alpha = 1/16$.

In addition to the average bit rate, the algorithm estimates the bit rate variance. The variance is smoothed in the same fashion as the bit rate, as shown below:

$$\Delta_i = |B_i - \text{avg}_i|$$

$$\text{var}_{i+1} = (1-\beta) \cdot \text{var}_i + \beta \cdot \Delta_i$$

Where $\Delta_i$ is the difference between the measured bit rate and the average bit rate for the current iteration $\text{var}_i$ is the variance computed for the current estimation, and $\beta$ is the weight given to the current variance measurement. In a prototype implementation, $\beta$ has been chosen to be $1/8$.

For each iteration, the current estimate (or the achievable bit rate) is computed as follows:

$$\hat{B}_i = \text{avg}_i - 4 \cdot \text{var}_i$$

This means that if the variance is large then the client 12 uses much less than the average bandwidth. On the other hand, when the bandwidth is stable and the variance is low, the client 12 converges to use the total bandwidth available on the link.

Two exceptional cases are considered where the estimation is reset: when the variance is too large (e.g. greater than half the average bit rate) or when there was a discontinuity in the RTP sequence numbers, which means that RTP packets were lost.

In the above cases, the average and variance estimates are reset as follows:

$$\text{avg}_{i+1} = \frac{\text{avg}_i + B_i}{2}$$

$$\text{var}_{i+1} = \text{avg}_{i+1} \div 10$$

The event of a RTP discontinuity triggers new bit rate estimation for the concerned path/server and/or a re-scheduling of all the previously scheduled chunks.

Server and chunk scheduling is performed by the means for server and chunk scheduling 44. Each time the client 12 finishes receiving the requested chunk for a given server (the server becomes idle), it updates the bandwidth estimation for that server and uses the connection again to retrieve another chunk. Depending on the availability and relative bit rates of all server paths, the server connection can be used either to retrieve the next chunk to be played out or a chunk to be played out later, i.e. this is called chunk scheduling. The scheduling algorithm is described in the following.

First the means for server and chunk scheduling 44 select the next chunk's bit rate. In order to do so, the means for server and chunk scheduling 44 sums the individual bit rate estimates (see below) of all servers 14, 16, and 18 to get the aggregate bit rate since all servers are used in parallel. The selected chunk's playout rate is the encoding bit rate immediately inferior to the aggregate bit rate.

At the time $t_e$ when the decoder buffer will be empty, first the chunk arrival time for each server 14, 16, and 18 using the current playout and streaming parameters is computed: $a_k$ is the time when the path k becomes idle (reception of last or scheduled chunk is finished), d chunk duration B playout bit rate and $B_k$ the current bit rate estimate for server/path k. The time it would take to download the next chunk from server k is noted $D_k$ with $D_k = d \cdot B/B_k$. The arrival time of chunk if server k is used becomes: $R_k = a_k + D_k$ The algorithm selects the server that yields the lowest $R_k$. In addition the arrival time of the chunk must be earlier than the time when the decoder buffer will be empty ($t_e$), i.e. $R_k < t_e$ must be satisfied. If it is not, the buffer will run dry and there will be a visible interruption in the playout. In such case, the playout bit rate will be reduced to the next lower bit rate. If the arrival time condition is satisfied, the chunk retrieval is scheduled on the server k. The transmission rate must be adjusted to match the current bit rate estimate for server/path k. This is done using the Speed: header of the RTSP PLAY request with Speed=$B_k/B$.

For example, assuming that the playout rate B is 1 Mbps (trackID 1 is being played), the current bit rate estimate $B_k$ is 400 kbps, we would have Speed=0.4. As a side note, if the periodic bandwidth estimation process was triggered for the current chunk, we would multiply the resulting speed by 1.2.

Below is the corresponding request that would be sent to server k (assuming no bandwidth estimation is performed for the current chunk):

```
PLAY      rtsp://multimedia.example.com/stream/trackID=1
RTSP/1.0
CSeq: 838
Range: npt=40-42
Speed: 0.4
```

If the server is currently idle, then the following RTSP request is issued immediately. Otherwise if the server is still being used then the RTSP request will be delayed until the server becomes idle.

Finally, a new chunk is going be pushed onto the buffer and therefore the value $t_e$ is incremented by the duration of the chunk (d): $t_e = t_e + d$. If any of the servers is idle, the previous steps are repeated until all the servers 14, 16, and 18 are busy. Otherwise the means for server and chunk scheduling 44 waits for a server to become idle again.

Bin allocation is performed by the means for bin allocation 46. Each time a request is sent towards a server 14, 16, and 18 for a given chunk, the response is linked to a bin allocated from a linked list that guarantees the correct consumption order. That is, the head of the list is the bin containing the next packets to be given to the decoder. The tail of the list is the bin that contains the last packets to be decoded.

RTP re-numbering and re-time stamping is performed by the means for RTP re-numbering and re-time stamping 48. It is necessary to normalize the final RTP stream delivered to the video decoder/demultiplexer. For each request sent to a given server 14, 16, and 18, a reception bin has been allocated with the correct consumption order. Once all the RTP packets corresponding to that request have been received, the RTP timestamps and sequence numbers are updated such that the decoder cannot distinguish a stream received from multiple servers from a stream received from a single server.

In practice, the sequence number and RTP time of all the packets are renumbered starting with the last sequence number and RTP timestamp used for feeding the decoding buffer.

Accordingly, the invention allows multipath adaptive streaming applied to RTSP/RTP protocol suite. A smart usage of the Speed parameter in the RTSP protocol allows parallel usage of multiple servers as well as probing of the state of the network. The parallel usage of multiple RTSP servers by the client allows quickly reacting to changing network conditions and maximizing the user experience. The invention applies to the existing RTSP/RTP as used in the IPTV infrastructure.

In other words, the system corresponding to the preferred embodiment of the invention is system for transmitting an audiovisual content by using a multipath adaptive streaming technique in a network environment comprising the plurality of servers 14, 16, 18; each of the servers configured for the transmission of the multimedia content based on a RTP/RTSP compliant communication protocol through the respective data paths 20, 22, 24 to the client 12, wherein the client 12 includes a controller 40 being capable of probing each of said data paths 20, 22 and 24 in order to determine a respective bandwidth associated to each of the data paths 20, 22 and 24 and to request a chunk of said multimedia content from each of the servers 14, 16 and 18 according to the determined respective bandwidth.

The controller 40 includes means for the estimation 42 of the available bit-rate for each of the data paths 20, 22 and 24 between each of the respective servers 14, 16, 18 and the client 12, and is configured to perform server speed control at the servers 14, 16 and 18.

The controller 40 also includes means for chunk selection 44 according to the available bit-rate, for selecting the next chunk to be delivered by the respective server 14, 16, 18.

The controller 40 further includes means for bin allocation 46, configured for the linking of a specific chunk of one of the servers 14, 16, 18, to a bin allocated from a linked list in order to achieve a correct consumption order at the client (receiver) side.

As to proceed to the construction of (to form) a single coherent stream, the controller 40 includes means for RTP re-numbering and re-timestamping 48 for updating RTP timestamps and sequence numbers. This allows to form a single coherent stream at the client side, as if it would have been received, for example, from a unique server.

The method used according to the preferred embodiment of the invention is thus a method for adaptive streaming in a multipath environment comprising:
  providing a client; and
  providing a plurality of servers 14, 16, 18 being respectively configured to transmit multimedia content in a RTP/RTSP environment through a respective data path 20, 22, 24, to the client, wherein the client 12 includes a controller 40 for probing each of the data paths 20, 22, 24, in order to determine a respective bandwidth associated to each of said data paths 20, 22 and 24, and to request a chunk of the multimedia content from any of the servers 14, 16, 18 according to the respective determined bandwidth.

The controller includes means for bit-rate estimation of a path 42 in order to perform server speed control at the servers 14, 16, 18, bandwidth measurement and bandwidth estimation in parallel for each of the servers 14, 16, 18, being used in the multipath streaming session.

According to the preferred embodiment the bit-rate estimation of a path is repeated periodically.

The bit-rate estimation of a path 42 comprises a step of controlling the speed of the corresponding server 14, 16, 18, by adding a speed RTS standard attribute to a play request.

For each server 14, 16, 18, the current rate is then used by a smoothing algorithm to iteratively determine an estimate to infer the achievable bit rate from the bit rate measured during the previous iterations.

For each server 14, 16, 18, a variance is computed for the current rate.

The controller means 40 includes means for chunk scheduling 44 (or chuk selection) for performing a bit rate selection for the next chunk to be delivered by the respective server 14, 16, 18.

Individual bit rate estimates are summed for all servers 14, 16, 18 to get the aggregate bit rate and a chunk's playout rate is selected at the encoding bit rate immediately inferior to the aggregate bit rate.

The key elements of the invention are standard RTSP protocol (as opposed to HTTP streaming) and therefore reuse of existing ecosystem, signalling of the multiple versions of the content with standard SDP, with a new attribute to indicate availability of the content on multiple servers, concurrent operation of multiple servers/multiple network paths through RTSP signalling continuous evaluation of the available bandwidth on the individual network paths based on RTSP protocol and continuous balancing of the data rate on multiple paths based on anticipation delivery scheme.

Although certain embodiments only of the invention have been described herein, it will be understood by any person skilled in the art that other modifications, variations, and possibilities of the invention are possible. Such modifications, variations and possibilities are therefore to be considered as falling within the spirit and scope of the invention and hence forming part of the invention as herein described and/or exemplified.

This invention having been described in its preferred embodiment, it is clear that it is susceptible to numerous modifications and embodiments within the ability of those skilled in the art and without the exercise of the inventive faculty. Accordingly, the scope of the invention is defined by the scope of the following claims.

All examples and conditional language recited herein are intended for pedagogical purposes to aid the read in understanding the principles of the invention and the concepts contributed by the inventor to furthering the art and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "decoder", "controller", "scheduler", "estimator", or their respective equivalent means performing corresponding functions should not be construed to refer exclusively to hardware capable of executing software, and may implicitly include, without limitation, digital signal processor ("DSP") hardware, read only memory ("ROM") for storing software, random access memory ("RAM"), and non volatile storage.

Other hardware, conventional and/or custom, may also be included. Similarly, any switching recited in the specification may be carried out through the operation of program logic, through dedicated logic, through the interaction of program control and dedicated logic, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be understood that the present principles may be implemented in various forms of hardware, software, firmware, special purpose processors, or a combination thereof. Preferably, the present principles may be implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present principles is programmed. Given the teachings herein, one of ordinary skill in the related art will be able to contemplate these and similar implementations or configurations of the present principles.

The invention claimed is:

1. A system comprising:
   a client device obtains a multimedia content by using a multipath adaptive streaming technique in a network environment comprising several servers;
   each of said servers being adapted for the transmission of said multimedia content based on a RTP/RTSP compliant communication protocol through respective data paths to said client device;
   at least a first and a second server store respectively a first encoded version and a second encoded version of said multimedia content, said first and said second encoded versions being different and being represented as sets of chunks;
   wherein the client device includes a controller that probes each of said respective data paths in order to determine a respective bandwidth associated with each of said respective data paths and said controller requests chunks of said multimedia content from said respective servers according to the determined respective bandwidth, a rendering time of said multimedia content, and at least two chunks being requested to said at least first and second servers, the client device uses slowest paths to get the chunks that are to be rendered later in time and uses fastest paths to get the chunks to be rendered sooner in time;
   wherein said controller estimates a bit-rate for each of said respective data paths in order the perform server speed control, bandwidth measurement and bandwidth estimation in parallel for each of said servers being used in the multipath streaming session;
   wherein said controller performs bin allocation for linking a specific chunk of one of the servers to a bin allocated from a linked list in order the achieve a correct consumption order; and
   wherein for each server the current bit-rate is then used by a smoothing algorithm to iteratively determine an estimate to infer an achievable bit-rate from the bit-rate estimated during the previous iterations.

2. The client device according to claim 1, wherein the controller includes means for chunk selection according to an available bit-rate, for selecting a next chunk to be delivered by the respective server.

3. The client device according to claim 1, wherein the controller includes means for RTP re-numbering and re-time stamping for updating RTP timestamps and sequence numbers so as to form a single coherent stream.

4. A method for adaptive streaming in a multipath environment, said method comprising:
   probing each respective data path in order to determine a respective bandwidth associated with each respective data path;
   requesting at least two chunks of said multimedia content encoded in two different versions from at least two among several servers in a multipath streaming session according to the determined respective bandwidth and a rendering time of said multimedia content;
   estimating a bit-rate for each respective data path in order the perform server speed control, bandwidth measurement and bandwidth estimation in parallel for each of the several servers being used in the multipath streaming session;
   performing bin allocation for linking a specific chunk of one of the servers to a bin allocated from a linked list in order the achieve a correct consumption order; and
   receiving multimedia content in a RTP/RTSP environment through respective data paths, chunks to be rendered later in time being received through slowest paths, and chunks to be rendered sooner in time being received through fastest paths;
   wherein for each server the current bit-rate is then used by a smoothing algorithm to iteratively determine an estimate to infer an achievable bit-rate from the bit-rate estimated during the previous iterations.

5. The method according to claim 4, wherein the bit-rate estimation of each of said respective data paths is repeated periodically.

6. The method according to claim 4, wherein the bit-rate estimation of each respective data path controls the speed of the respective server by adding a speed RTSP standard attribute to a play request.

7. The method according to claim 4, wherein for each server a variance is computed for the current bit-rate.

8. The method according to claim 4, further comprising chunk scheduling, wherein said chunk scheduling includes performing a bit rate selection for a next chunk to be delivered by the respective server.

9. The method according to claim 8, wherein individual bit rate estimates are summed for all servers to get an aggregate bit rate and a chunk's playout rate is selected at an encoding bit rate immediately less than the aggregate bit rate.

10. The method according to claim 4, further comprising RTP re-numbering and retime stamping, said re-time stamping includes updating RTP timestamps and sequence numbers so as to form a single coherent stream.

* * * * *